US00RE45374E

(19) United States
(12) Reissued Patent
Greenfield

(10) Patent Number: US RE45,374 E
(45) Date of Reissued Patent: Feb. 17, 2015

(54) ARTHRITIC-FRIENDLY BOTTLE CAP

(76) Inventor: Brian Greenfield, Montreal West (CA)

(21) Appl. No.: 29/427,828

(22) Filed: Jul. 23, 2012

Related U.S. Patent Documents

Reissue of:
(64) Patent No.: Des. 620,356
Issued: Jul. 27, 2010
Appl. No.: 29/352,847
Filed: Dec. 28, 2009

U.S. Applications:
(63) Continuation-in-part of application No. 29/346,051, filed on Oct. 26, 2009, now Pat. No. Des. 613,161.

(51) LOC (10) Cl. ..... 09-07
(52) U.S. Cl.
USPC ..... D9/443; D9/453
(58) Field of Classification Search
USPC ..... D9/443, 445, 435, 447, 451, 453, 709, D9/705, 708; D7/354, 571, 567; D24/197, D24/224; 222/566, 525; 220/288; 215/329, 215/238, 222, 252, 256; 116/308
See application file for complete search history.

(56) References Cited

U.S. PATENT DOCUMENTS

| | | | | | |
|---|---|---|---|---|---|
| D93,650 | S | * | 10/1934 | Fleish | D9/453 |
| D202,137 | S | * | 8/1965 | Wilson | D9/450 |
| D220,613 | S | * | 5/1971 | Beck | D9/453 |
| 3,717,275 | A | * | 2/1973 | Willis | 215/329 |
| 4,731,512 | A | | 3/1988 | Barriac | 215/220 |
| D299,699 | S | * | 2/1989 | Ask | D9/453 |
| D354,914 | S | * | 1/1995 | Newman | D9/503 |
| 5,429,257 | A | | 7/1995 | Greenfield et al. | 215/295 |
| D389,741 | S | * | 1/1998 | Barrie, II | D9/429 |
| 5,704,502 | A | | 1/1998 | Greenfield | 215/295 |
| D451,393 | S | * | 12/2001 | Gerhart et al. | D9/453 |
| D461,407 | S | * | 8/2002 | Barnes et al. | D9/453 |
| D464,434 | S | * | 10/2002 | Morano | D24/197 |
| D519,837 | S | * | 5/2006 | Sturk et al. | D9/453 |
| D542,133 | S | * | 5/2007 | Haber et al. | D9/453 |

(Continued)

OTHER PUBLICATIONS

"Nittonhundra Elva Nittohundra Attiosex Pharmacia Sjuttiofem," Lasse Johanson, Ljungforetagen Orebro 1986, p. 53 (Photograph of Salazopyrin tablet container) ("1911-1986 Pharmacia 75 year").

(Continued)

*Primary Examiner* — Phillip S Hyder
(74) *Attorney, Agent, or Firm* — Leason Ellis LLP.

(57) CLAIM

The ornamental design for an arthritic-friendly bottle cap, as shown and described.

DESCRIPTION

FIG. 1 is a perspective view of an arthritic-friendly bottle cap;
FIG. 2 is a front *elevation* view of the bottle cap *of FIG. 1*, where the rear view is a mirror image;
FIG. 3 is a right *side elevation* view of the bottle cap *of FIG. 1*, where the left view is a mirror image;
FIG. 4 is a *top* plan view of the bottle cap *of FIG. 1*; and,
FIG. 5 is a bottom *plan* view of the bottle cap *of FIG. 1*.
The phantom lines depict environmental subject matter only and form no part of the claimed design.

1 Claim, 3 Drawing Sheets

Matter enclosed in heavy brackets [ ] appears in the original patent but forms no part of this reissue; matter printed in italics indicates the additions made by reissue.

(Amended)

(56) References Cited

U.S. PATENT DOCUMENTS

D557,605 S * 12/2007 Reber et al. ..... D9/453
D607,325 S * 1/2010 Rogers et al. ..... D9/453

OTHER PUBLICATIONS

Five (5) Photographs of Azulfidine Tablet Container, Mar. 29, 2002.

* cited by examiner

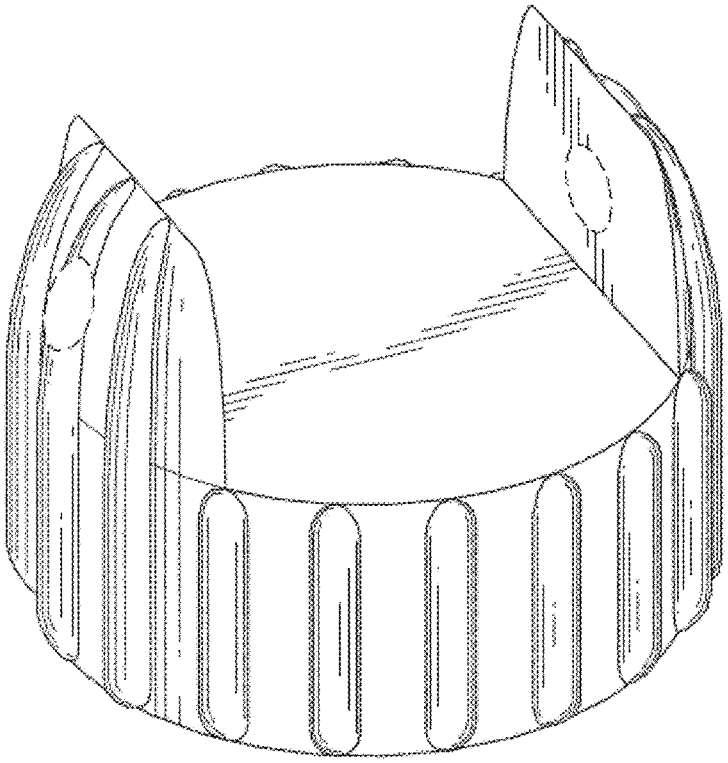
Fig. 1 (Amended)
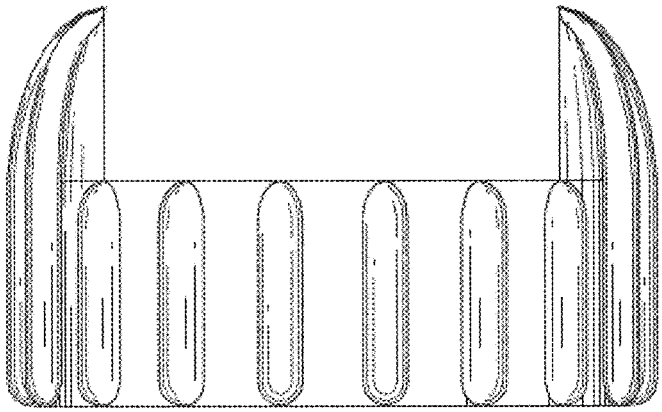
Fig. 2 (Amended)

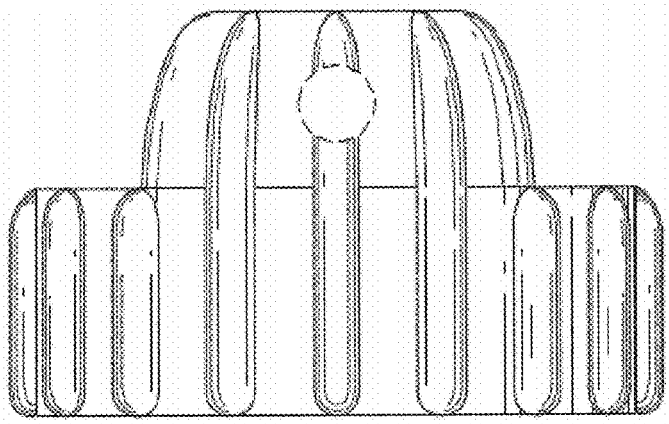
Fig. 3 (Amended)
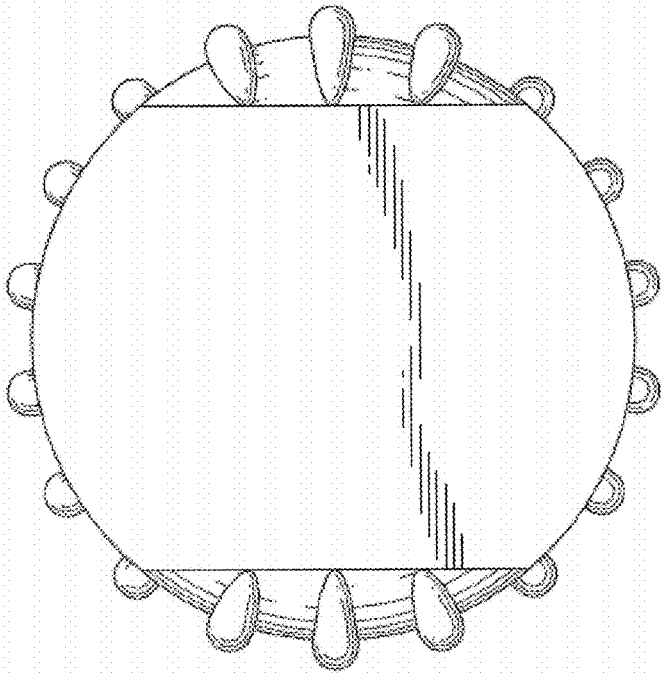
Fig. 4 (Amended)

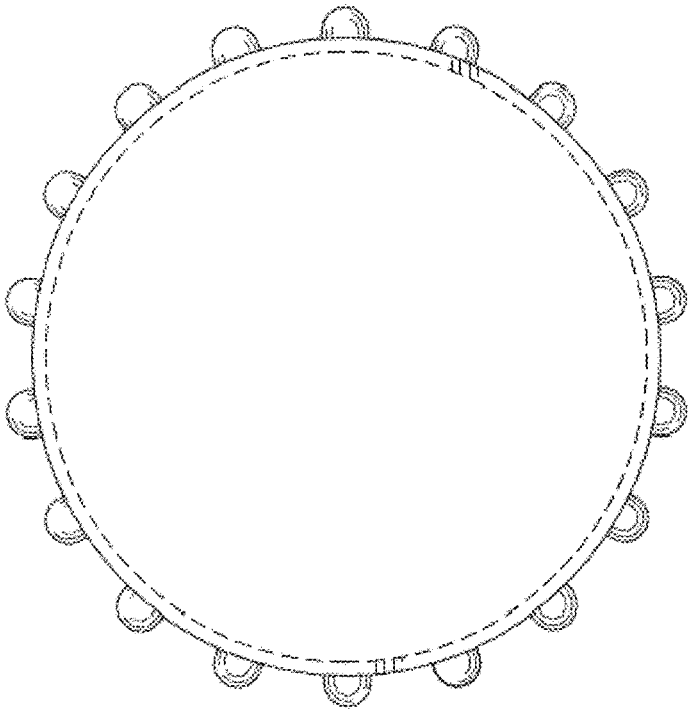
Fig. 5 (Amended)